United States Patent
Iwami et al.

(10) Patent No.: US 7,287,116 B2
(45) Date of Patent: Oct. 23, 2007

(54) STORAGE VIRTUALIZATION SYSTEM AND METHOD HAVING A VIRTUALIZATION SWITCH

(75) Inventors: Naoko Iwami, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 10/230,174

(22) Filed: Aug. 29, 2002

(65) Prior Publication Data

US 2003/0191904 A1 Oct. 9, 2003

(30) Foreign Application Priority Data

Apr. 5, 2002 (JP) .............................. 2002-103339

(51) Int. Cl.
*G06F 12/00* (2006.01)
(52) U.S. Cl. .................... 711/6; 711/114; 711/156; 711/170; 714/2
(58) Field of Classification Search ................. 365/49; 709/104, 105, 201, 213, 217, 226, 238, 245, 709/324; 710/38, 316; 711/6, 108, 153, 711/170, 203, 221, 114, 156; 714/2
See application file for complete search history.

(56) References Cited

U.S. PATENT DOCUMENTS

| | | | |
|---|---|---|---|
| 6,601,101 B1 * | 7/2003 | Lee et al. .................... 709/227 |
| 6,625,747 B1 * | 9/2003 | Tawil et al. .................. 714/6 |
| 6,944,785 B2 * | 9/2005 | Gadir et al. .................. 714/4 |
| 2002/0049803 A1 * | 4/2002 | Bandhole et al. ........... 709/104 |
| 2002/0091898 A1 | 7/2002 | Matsunami et al. |
| 2002/0156987 A1 * | 10/2002 | Gajjar et al. ................. 711/203 |
| 2003/0131182 A1 * | 7/2003 | Kumar et al. .................. 711/5 |
| 2004/0078419 A1 * | 4/2004 | Ferrari et al. ............... 709/201 |

FOREIGN PATENT DOCUMENTS

| | | |
|---|---|---|
| EP | 1484685 A1 | 12/2004 |
| JP | 200041068 | 2/2000 |
| JP | 2000242434 | 9/2000 |
| JP | 2001331355 | 11/2001 |
| JP | 2002063063 | 2/2002 |
| WO | 03075161 | 9/2003 |

OTHER PUBLICATIONS

"Virtualizing the SAN" published on Jul. 5, 2000, pp. 1-20.

* cited by examiner

*Primary Examiner*—Woo H. Choi
(74) *Attorney, Agent, or Firm*—Mattingly, Stanger, Malur & Brundidge, P.C.

(57) ABSTRACT

In a virtualization system, physical volumes are virtualized between servers and storage systems such that even when high-performance functions including a remote copy are provided, a virtualization unit does not become a bottleneck of processing. For this purpose, a virtualization node to conduct virtualization includes at least one virtualization switch which receives data from a server and converts the data into data for a real volume to send the data to an associated storage and which receives data from a storage and converts the data into data from a virtualized volume to send the data to a server and at least one virtualization server which receives data requiring processing such as a remote copy from the virtualization switch, performs a particular processing for the data, and then transmits the data via the switch to a server or a storage.

35 Claims, 13 Drawing Sheets

FIG. 5

| VIRTUAL PORT ID | VIRTUAL VOLUME | | VIRTUALIZATION SWITCH | VIRTUALIZATION SERVER | SERVER | No. OF REAL VOLUMES | CONSTITUENT/REAL VOLUME INFORMATION | | | | | | |
|---|---|---|---|---|---|---|---|---|---|---|---|---|---|
| | No. | SIZE | | | | | PORT ID | No. | SIZE | START ADDRESS | END ADDRESS | START ADDRESS | END ADDRESS |
| 123 | 0 | 1MB | XXX | DDD | α | 1 | AAA | 8 | 1MB | 8 | 1954 | - | - |
| 123 | 1 | 1MB | XXX | DDD | β | 2 | BBB | 8 | 500KB | 0 | 977 | - | - |
| | | | | | | | CCC | 3 | 500KB | 0 | 977 | --- | --- |
| 456 | 16 | 1MB | YYY | CCC | α | 1 | AAA | 3 | 1MB | 0 | 1954 | - | - |

FIG. 6

| STORAGE | PORT ID | No. | USED AREA | AVAILABLE AREA |
|---|---|---|---|---|
| | 601 | 602 | 603 | 604 | 605 |
| PPP | AAA | 0 | 0~1954 | 0 |
| PPP | AAA | 1 | 0~1954 | 1955~3000 |
| ⋮ | | | | |

FIG. 7

| VIRTUALIZATION SWITCH (701) | STATE (702) | LOAD (703) |
|---|---|---|
| XXX | NORMAL | 50 |
| ⋮ | | |
| YYY | NORMAL | 50 |

FIG. 8

| | 801 | | 802 | | 803 |
|---|---|---|---|---|---|
| VIRTUALIZATION SERVER | | STATE | | LOAD | |
| DDD | | NORMAL | | 50 | |
| ⋮ | | ⋮ | | ⋮ | |
| CCC | | NORMAL | | 50 | |

FIG. 9

| 901 VIRTUAL PORT ID | 902 VIRTUAL VOLUME | | 903 VIRTUALIZATION SWITCH | 907 No. OF REAL VOLUMES | 908 PORT ID | 909 No. | 910 SIZE | 911 START ADDRESS | 912 END ADDRESS | 908 PORT ID | 909 No. | 910 SIZE | 911 START ADDRESS | 912 END ADDRESS | ---- |
|---|---|---|---|---|---|---|---|---|---|---|---|---|---|---|---|
| | 905 No. | 906 SIZE | | | | | | | | | | | | | |
| 123 | 0 | 1MB | XXX | 1 | AAA | 8 | 1MB | 8 | 1954 | - | - | - | - | - | ---- |
| 123 | 1 | 1MB | XXX | 2 | BBB | 8 | 500KB | 0 | 977 | CCC | 3 | 500KB | 0 | 977 | ---- |
| | | | | | | | | | -------- | | | | | | |
| 456 | 16 | 1MB | YYY | 1 | AAA | 3 | 1MB | 0 | 1954 | - | - | - | - | - | ---- |

| VIRTUAL PORT ID | VIRTUAL VOLUME | | VIRTUALIZATION SWITCH | No. OF REAL VOLUMES | CONSTITUENT REAL VOLUME INFORMATION | | | | | | | |
|---|---|---|---|---|---|---|---|---|---|---|---|---|
| | No. | SIZE | | | PORT ID | No. | SIZE | START ADDRESS | END ADDRESS | PORT ID | No. | SIZE | START ADDRESS | END ADDRESS |
| 123 | 0 | 1MB | XXX | 1 | AAA | 8 | 1MB | 8 | 1954 | - | - | - | - | - |
| 123 | 1 | 1MB | XXX | 2 | BBB | 8 | 500KB | 0 | 977 | CCC | 3 | 500KB | 0 | 977 |

1001 1005 1002 1006 1003 1007 1008 1009 1010 1011 1012 1004

STORAGE VIRTUALIZATION SYSTEM AND METHOD HAVING A VIRTUALIZATION SWITCH

BACKGROUND OF THE INVENTION

The present invention relates to a computer system virtually managing or controlling storage areas of a plurality of storage systems as one logical storage area or a plurality of logical storage areas.

Recently, the amount of data used in an information processing system has been considerably increased and hence storage management expenses imposed on the user have been increased. To cope with this problem, a report "Virtualizing the SAN" published on Jul. 5, 2000, pp. 1-20 from an investigating company called "Morgan Keegan" describes a system including a plurality of storage systems. In the system, storage areas of the storage systems are virtualized into logical storage areas (virtual volumes). By allocating the virtual volumes to users (computers), the storage management expenses of the system users are reduced. The report describes two approaches on a system configuration and a method to implement the virtualization.

In this specification, a storage system is used to indicate a single storage such as a disk device and a set of "just bunch of disks (JBOD)" and a controller thereof as well as a set of a plurality of storages such as redundant array of inexpensive disks (RAID) and a controller thereof.

The first approach provides a virtualization system in which a computer connected between a computer (to be called a server hereinbelow) using the storage system and the storage system manages or controls a correspondence between storage areas of the storage system and virtual volumes indicated to the server. In the system, having received an access request to a virtual volume, the computer converts the request to an access request to a storage area of the storage system and issues the request to the storage system.

The second approach provides a virtualization system including a virtualization or virtualizing computer, which controls a correspondence between storage areas of the storage system and an area of a virtual volume indicated to the user. In the system, to access a virtual volume, a server issues an inquiry to the virtualization computer to obtain a position or an address of a storage area of a storage system corresponding to the virtual volume to be accessed. In response to the inquiry, the virtualization computer sends an address in the storage area to the server according to information managed by the virtualization computer. Having received the address from the virtualization computer, the server accesses the area of the storage system using the address.

According to the second approach, the server must collaborate with the virtualization computer. In consequence, it is necessary to prepare a collaborative function for the virtualization computer in association with many types of operating systems (OS) of servers. However, considerably many types of general operating systems are available in the present stage of art. It is therefore not practical to cope with all operating systems.

On the other hand, when compared with the second approach, the first approach is advantageous because it is not required to cope with the respective operating systems. However, the computer connected to the servers and the storage systems executes processing such as the address translation and the issuance of a request to a storage system. This leads to a problem that a limit of performance of the computer becomes a limit of performance of the system. For example, saving data from a storage system to another storage system imposes quite a heavy load on the computer. In this case, access performance of the overall system is also reduced. If the computer implementing the virtualization fails, the entire storage system cannot be used.

SUMMARY OF THE INVENTION

It is therefore an object of the present invention to provide a virtualization system capable of mitigating the load imposed on an apparatus (virtualization apparatus) to perform a virtualization processing between a server and a storage system.

Another object of the present invention is to provide a virtualization system capable of achieving desired performance in association with increase in the load imposed on the virtualization apparatus executing virtualization processing between a server and a storage system.

Further another object of the present invention is to provide a virtualization system in which even if the computer managing virtualization fails, input and output operations of data are not adversely influenced between a server and a storage system.

To achieve the objects according to the present invention, the virtualization apparatus to conduct virtualization includes a switch (to be referred to as a virtualization switch hereinbelow) to execute virtualization processing and a computer (to be referred to as a virtualization server) to execute virtualization processing. In the configuration, the virtualization switch executes processing as follows. The switch receives data from the server to convert the data into data to be fed to a storage area of the storage system and transmits the data to the storage system. Or, the virtualization switch converts the received data into data from a virtualized volume and sends the data to the server. In the operation, the virtualization apparatus uses virtualization information, i.e., information of a correspondence between virtual volumes and storage areas of the storage system.

On the other hand, the virtualization server receives, from the virtualization switch, data requiring predetermined processing, for example, data to be copied from a storage system onto another storage system. The server executes the predetermined processing and then sends the data to the server or an associated storage device.

In the configuration in which the virtualization device includes a plurality of virtualization servers and a plurality of virtualization switches, when one of the switches or the servers fails, it is possible that the processing of virtualization is taken over to, for example, another virtualization server.

A configuration of a favorable embodiment of the present invention includes a computer for management (control server) which controls virtual information indicating a correspondence between storage areas of the storage system and virtual volumes and which also controls states of devices in the virtualization system. In the configuration, when the control server issues an instruction to the virtualization apparatus to change an access path between the server and the storage system, the virtualization apparatus allocates several ones of the virtual volumes as processing objects in a section of the virtualization apparatus to processing of devices with a lower processing load.

According to the present invention, there is provided a virtualization system in which the computer to conduct the virtualization does not become a processing bottleneck in the overall system. Moreover, according to the present invention, there is provided a virtualization system which achieves desired performance in association with increase in the processing load in a section executing the virtualization processing.

According to the present invention, there is provided a virtualization system in which even when a failure occurs in the virtualization apparatus, the failure does not exert adverse influence on any external device.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing an example of a virtual volume control table in the control server.

FIG. 6 is a diagram showing an example of a real volume control table in the control server.

FIG. 7 is a diagram showing an example of a state control table of the virtualization switch in the control server.

FIG. 8 is a diagram showing an example of a state control table of the virtualization server in the control server.

FIG. 9 is a diagram showing an example of a virtual volume control table in the virtualization server.

FIG. 10 is a diagram showing an example of a virtual volume control table in the virtualization switch.

DESCRIPTION OF THE EMBODIMENTS

Figure 1:
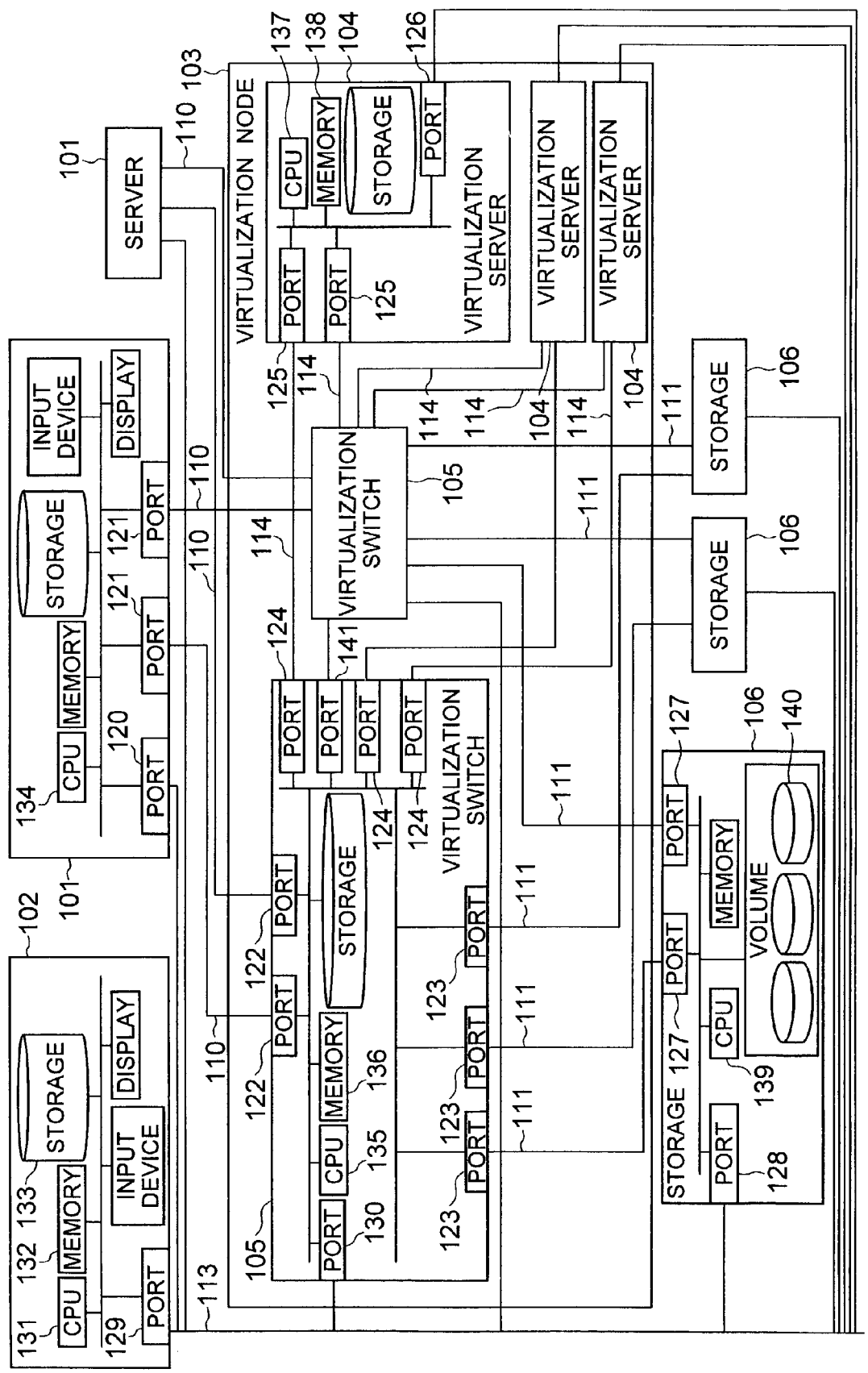
FIG. 1 is a diagram showing a configuration of an embodiment of a system according to the present invention.

FIG. 1 shows a configuration of an embodiment of a system according to the present invention. The system includes servers 101, storage systems 106, a virtualization apparatus (virtualization node) 103 connected between the servers 101 and the storages 106, and a control server 102.

The servers 101 are connected via networks 110 to the virtualization node 103. The storage systems 106 are connected via a network 111 to the virtualization node 103. The networks 110 and 111 may be networks of one type of protocol or networks of mutually different types of protocols. For example, it is possible that the networks 110 are networks of transmission control protocol/internet protocol (TCP/IP) and the networks 111 are fiber-channel networks.

Moreover, the networks 110 may be of the same type for each server connected thereto or may be of mutually different types for the respective servers. For example, networks of TCP/IP and networks of the fiber-channel protocol can be used. Additionally, the networks 111 may also be of the same type for each storage system connected thereto or may be of mutually different types for the respective storage systems.

The virtualization node 103 supplies to the server 101 a virtual volume configured by virtualizing storage areas of the storage system 106. The control server 102 manages a correspondence between the storage areas of the storage system 106 and the storage areas and controls the virtualization node 103.

In this specification, a "storage area" is a storage area indicated by the storage system 106 to another device. However, the storage area indicated by the storage system 106 has a one-to-one correspondence to a physical storage area of a disk device 140 of the storage system 106 or matches a logical storage area virtualized in the storage system 106 such as a logical unit (LU) of an RAID system. In this specification, it is not particularly discriminated whether a "storage area" is a logical or physical storage area of the storage system 106. In this connection, a storage area indicated by the storage system 106 will be referred to as a real volume hereinbelow.

The server 101 includes a central processing unit (CPU) 134 to execute programs accessing the storage systems 106, ports 121 to conduct communication of data with the storage systems 106, and a port 120 connected via a network 113 to the control server 102. The server 101 includes at least one port 121, but may include two or more ports 121.

The storage system 106 includes ports 127 to communicate data with external devices, a port 128 connected via the network 113 to the control server 102, disk devices 140 to store data therein, and a control unit 139 to operate a program controlling, for example, data communication with the disk devices 140. The storage system 106 includes at least one port 127, but may include two or more ports 127.

The control server 102 includes a memory 132, a storage 133, a CPU 131 which executes programs to manage a correspondence between real volumes and virtual volumes of the storage systems 106 according to information stored in the storage 133 and which executes programs to manage a state of the virtualization node 103 to control the virtualization node 103 so that the node 103 provides stable volume accesses to the server 101, and a port 129 to communicate data via the network 113 with external devices such as the server 101, the virtualization node 103, and the storage systems 106.

The virtualization node 103 includes a virtualization switch 105 and a virtualization server 104. However, the virtualization node 103 may be in a configuration in which the switch 105 and server 104 are integrally configured as one unit or are connected to each other via a network or the like. Additionally, the node 103 desirably includes a plurality of virtualization switches 105 and a plurality of virtualization servers 104.

The virtualization switch 105 receives data sent from the server 101 to a virtual volume, converts the data into data to be sent to a real volume, and sends the data to the storage system 106. Moreover, the switch 105 converts data received from the storage system into data to be sent to a virtual volume and sends the data to the server 101.

The switch 105 includes port 122 to communicate data with the servers 101, ports 124 to communicate data with the virtualization servers 104, ports 123 to communicate data with the storage system 106, a port 141 to communicate data with another virtualization switch 105, a port 130 to communicate data via the network 113 with the control server 102, a memory 136, and a CPU 135 to execute a program which converts data received from a server 101 according to information stored in the memory 136 to send the data to the storage systems 106 and which converts data received from a storage system 106 to send the data to an associated server 101.

However, the configuration may include one or more ports 141 to communicate data between the switches 105. Or, the switch 105 may be omitted depending on the particular case.

Furthermore, when the virtualization node 103 includes a plurality of virtualization switches 105, the servers 101 are connected to the switches 105 in one of two ways as follows.

First, each server 101 is connected to a plurality of switches. Second, a plurality of servers 101 are connected via ports 141 to each other such that either one of the switches 105 is connected to the servers 101.

In either cases, when a server 101 detects a failure in one of the virtualization switches 105 or when a server 101 receives information of a failure in a switch 105 from a control server 102 or the like, the server 101 changes an access route to the virtualization node 103, specifically, changes the switch 105.

Incidentally, the configuration may include at least one port 122 to communicate data with the servers 101, at least one port 124 to communicate data with the virtualization servers 104, and at least one port 123 to communicate data with the storage systems 106.

The virtualization server 104 receives data requiring predetermined processing from the virtualization switch 105, the data being selected from data beforehand received by the switch 105. The server 104 then executes the processing. Thereafter, the virtualization server 104 sends the processed data via the switch 105 to the server 101 or the storage system 106.

The virtualization server 104 includes ports 125 to communicate data via a network 114 with the virtualization switches 105, a port 126 to communicate data via the network 113 with the control server 102, a memory 138, and a CPU 137 to execute processing such as remote copy processing according to predetermined information. Incidentally, the configuration includes at least one port 125 to be connected to the virtualization switch 105.

Figure 2:
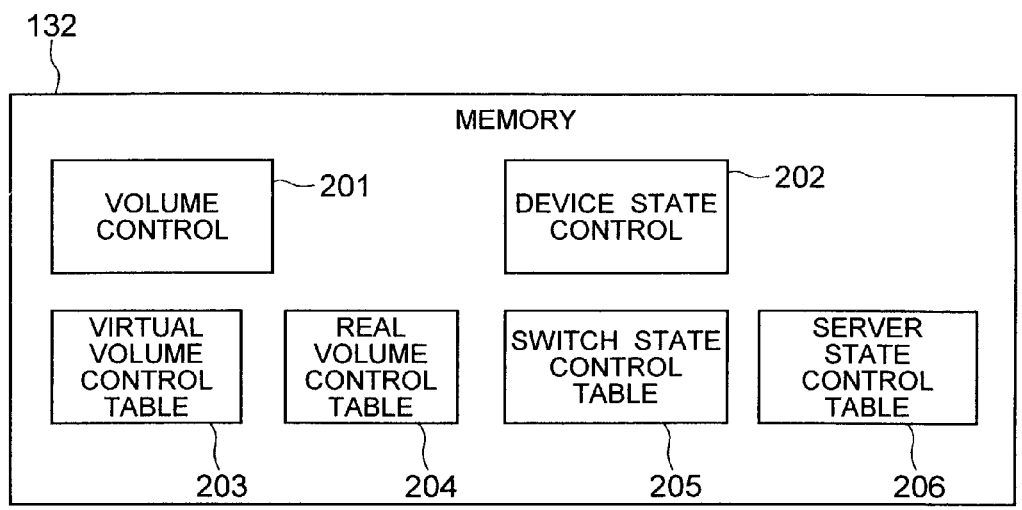
FIG. 2 is a diagram showing programs and tables stored in a memory of a control server.

FIG. 2 shows a layout of programs and tables of the control server 102. The memory 132 stores a volume control program 201 to control information indicating a correspondence between real volumes and virtual volumes of the storage systems 106, a device state control program 202 which controls a state of the virtualization node 103 to supply stable volume accesses to volumes to the servers 101, a virtual volume control table 203, a real volume control table 204, virtualization switch state control table 205, and a virtualization server state control table 206.

Figure 3:
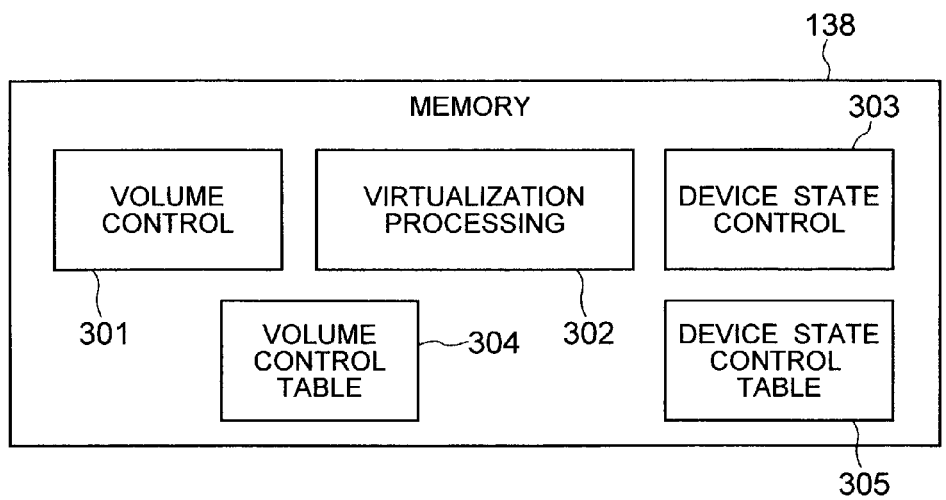
FIG. 3 is a diagram showing programs and tables stored in a memory of a virtualization server.

FIG. 3 shows a layout of programs and tables of the virtualization server 104. The memory 138 stores a volume control program 301, a virtualization processing program 302 which receives data from the virtualization switches to execute predetermined processing such as data copy or replication between the storage systems, a device state control program 303 to monitor a state of the load imposed on each virtualization node 103, a virtual volume control table 304, and a device state control table 305.

The volume control program 301 receives an instruction from the volume control program 201 of the control server 102 and is then executed by the virtualization server 104 to update the virtual volume control table 304. Having received an inquiry from the control server 102, the device state control program 303 is executed by the virtualization server 104 to notify a state of the virtualization server 104 at the point of enquiry, specifically, a utilization ratio or the like of the server 104.

The device state control table 305 stores information of the state of the load on the virtualization server 104, for example, a numeric value of the operation ratio or the like. The information of the load state may be, in addition to a numeric value, information of a degree, for example, "high" or "low".

Figure 4:
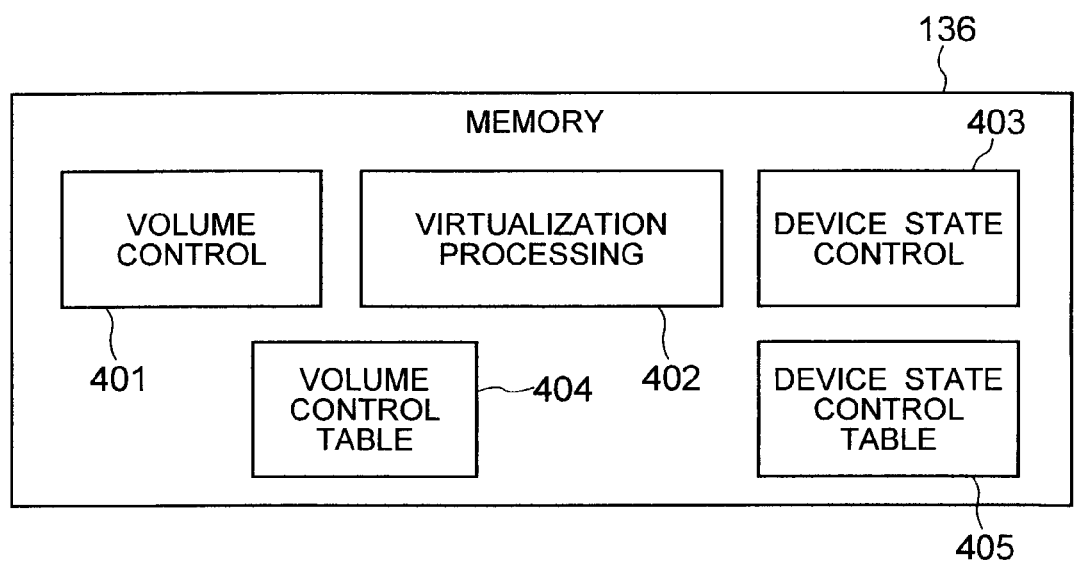
FIG. 4 is a diagram showing programs and tables stored in a memory of a virtualization switch.

FIG. 4 shows a layout of programs and tables of the virtualization switch 105. The memory 136 stores a volume control program 401, a virtualization program to execute virtualization processing, a device state control program 403 to monitor a state of each device, a virtual volume control table 404, and a device state control table 405.

When an instruction is received from the volume control program 201 of the control server 102, the volume control program 401 is executed by the virtualization switch 105 to update the virtual volume control table 404. The virtualization processing executed by the virtualization program 402 in the switch 105 is as follows.

The virtualization switch 105 receives data sent from a server 101 to a virtual volume and converts the data into data for a real volume of an associated storage system 106 to send the data to the storage system 106. Or, the switch 105 converts data received from the storage system 106 into data from a virtualized volume to send the data to the server 101. In this connection, the conversion of data specifically means a conversion from a virtual volume address into a real volume address or a conversion from a real volume address into a virtual volume address.

When an enquiry request is received from the control server 102, the device state control program 403 is executed by the virtualization switch 105 to notify a state of the switch 105 at the point of enquiry, specifically, a state of the input/output load on the switch or the like.

The device state control table 405 stores information indicating a state of the load on the switch 105, for example, a numeric value indicating the number of input/output operations of the switch 105. Incidentally, the information of the load state may be other than a numeric value, namely, may be information indicating a degree, for example, "high" or "low".

FIG. 5 shows an example of the virtual volume control table in the control server 102. In the example, an identifier (ID) of a port to access a virtual volume is registered to an entry 501. Information indicating the virtual volume is registered to an entry 502. An entry 502 includes an entry 507 to which a logical unit (LU) number of the virtual volume is registered and an entry 508 to which a size of the virtual volume is registered.

An identifier (ID) of the virtualization switch 104 controlling the pertinent virtual volume is registered to an entry 503. An identifier (ID) of the virtualization server 104 which collaborates with the virtualization switch 105 to execute processing for the pertinent virtual volume is registered to an entry 504. An identifier (ID) of a server 101 using the pertinent virtual volume is registered to an entry 505. Information of real volumes constituting the pertinent virtual volume is registered to an entry 506.

The entry 506 includes an entry 510 to which an identifier (ID) of a port to access a real volume is registered, an entry 511 to which a logic unit (LU) number of the real volume is registered, an entry 512 to which a size of the real volume is registered, and entries 513 and 514 to which a start address and an end address respectively indicating the start and end positions of an area of the real volume allocated to the pertinent virtual volume are respectively registered.

In this regard, the respective entries, excepting the entry 509, of the constituent real volume information are prepared for each virtual volume as many as there are real volumes allocated to the virtual volume.

For example, in the table of FIG. 5, a first row indicates that virtual volume "0" having a virtual port ID of "123" and a size of one megabyte (MB) is controlled by virtualization switch "XXX" and virtualization server "DDD" and the virtual volume is associated with an area ranging from a first address of "8" to an end address of "1954" of one real volume, i.e., volume "8" having a port ID of "AAA" and a size of 1 MB.

A second row of the table indicates that virtual volume "1" having a virtual port ID of "123" and a size of one megabyte (MB) is controlled by virtualization switch "XXX" and virtualization server "DDD" and the virtual volume includes two areas, namely, an area ranging from first address "0" to end address "977" of real volume "8" having a port ID of "BBB" and a size of 500 kilobytes (KB) and an area ranging from first address "0" to end address "977" of real volume "3" having a port ID of "CCC" and a size of 500 KB.

In this case, when it is inhibited that real volumes are divided to be allocated to virtual volumes, the range of each real volume is not required and hence the entries 512 and 513 may be omitted. When the real volumes are allocated to the virtual volumes according to a one-to-one correspondence, it is only necessary to specify a real volume to each virtual volume and hence the entries 509, 512, 513, and 514 may be omitted.

FIG. 6 shows an example of the real volume control table 204 in the control server 102. Information indicating a storage system is registered to an entry 601. A port identifier (ID) to access a real volume is registered to an entry 602. A logical unit (LU) number of the real volume is registered to an entry 603. An area of a real volume allocated to the virtual volume is registered to an entry 604. Information indicating an area not used for the virtual volume, i.e., an available area is registered to an entry 605.

Incidentally, when it is inhibited that real volumes are divided to be allocated to virtual volumes, the entries 604 and 605 may be omitted.

FIG. 7 shows an example of the state control table 205 in the virtualization switch 105 of the control server 102. An identifier (ID) of a virtualization switch 105 is registered to an entry 701. Information indicating a state, specifically, a "normal" or "abnormal" state of the switch 105 is registered to an entry 702. In this case, "normal" indicates that the switch 105 conducts a predetermined operation and "abnormal" indicates that a failure has occurred in the switch 105. Information indicating a load imposed on the switch 105 is registered to an entry 703.

FIG. 8 shows an example of the state control table 206 in the virtualization server 101 of the control server 102. An identifier (ID) of a virtualization server 101 is registered to an entry 801. Information indicating a state, specifically, a "normal" or "abnormal" state of the server 101 is registered to an entry 802. Information indicating a load imposed on the server 101 is registered to an entry 803.

FIG. 9 shows an example of the virtual volume control table 304 of the virtualization server 101. An identifier (ID) of a port to access a virtual volume is registered to an entry 901. Information indicating the virtual volume is registered to an entry 902. The entry 902 includes an entry 905 to which a logical unit (LU) number of the virtual volume is registered and an entry 906 to which a size of the virtual volume is registered.

An identifier (ID) of a virtualization switch 105 controlling the pertinent virtual volume is registered to an entry 903. Information indicating the virtual volume is registered to an entry 904. Specifically, the entry 904 includes an entry 907 to which information indicating the number of real volumes allocated to the virtual volume is registered, an entry 908 to which an identifier (ID) of a port to access a virtual volume is registered, an entry 909 to which a logic unit (LU) number of the virtual volume is registered, an entry 910 to which a size of the real volume is registered, and entries 911 and 912 to which a start address and an end address respectively indicating the start and end positions of an area of the real volume allocated to the pertinent virtual volume are respectively registered.

Incidentally, the respective entries, excepting the entry 907, of the entry 904 are prepared for each virtual volume as many as there are real volumes allocated to the virtual volume.

When it is inhibited that real volumes are divided to be allocated to virtual volumes, the entries 911 and 912 may be omitted. When the real volumes are allocated to the virtual volumes according to a one-to-one correspondence, the entries 907, 910, 911, and 912 may be omitted.

FIG. 10 shows an example of the virtual volume control table 404 of the virtualization switch 105. An identifier (ID) of a port for the server 101 to access a virtual volume is registered to an entry 1001. Information about the virtual volume is registered to an entry 1002. An entry 1002 includes an entry 1005 to which a logical unit (LU) number of the virtual volume is registered and an entry 1006 to which a size of the virtual volume is registered.

An identifier (ID) of a virtualization server 104 controlling the pertinent virtual volume is registered to an entry 1003. Information indicating information of real volumes constituting the virtual volume is registered to an entry 1004. Specifically, the entry 1004 includes an entry 1007 to which the number of real volumes is registered, an entry 1008 to which an identifier (ID) of a port to for the server to access a real volume is registered, an entry 1009 to which a logic unit (LU) number of the real volume is registered, an entry 1010 to which a size of the real volume is registered, and entries 1011 and 1012 to which a start address and an end address respectively indicating the start and end positions of an area of the real volume allocated to the pertinent virtual volume are respectively registered.

In this regard, the respective entries, excepting the entry 1007, of the entry 1004 are prepared for each virtual volume as many as there are real volumes allocated to the virtual volume.

When it is inhibited that real volumes are divided to be allocated to virtual volumes, the entries 1002 and 1003 may be omitted. When the real volumes are allocated to the virtual volumes according to a one-to-one correspondence, the entries 1007, 1010, 1011, and 1012 may be omitted.

The control server 102 executes processing in response to an instruction from the user as follows. According to a quantity of storage capacity desired by the user, the server 102 selects an appropriate number of real volumes from the real volumes of the storage systems 106 to set the selected real volumes as a virtual volume and then notifies a result of the operation to the user. For this processing, the server 102 executes the volume control program 201.

Figure 11:
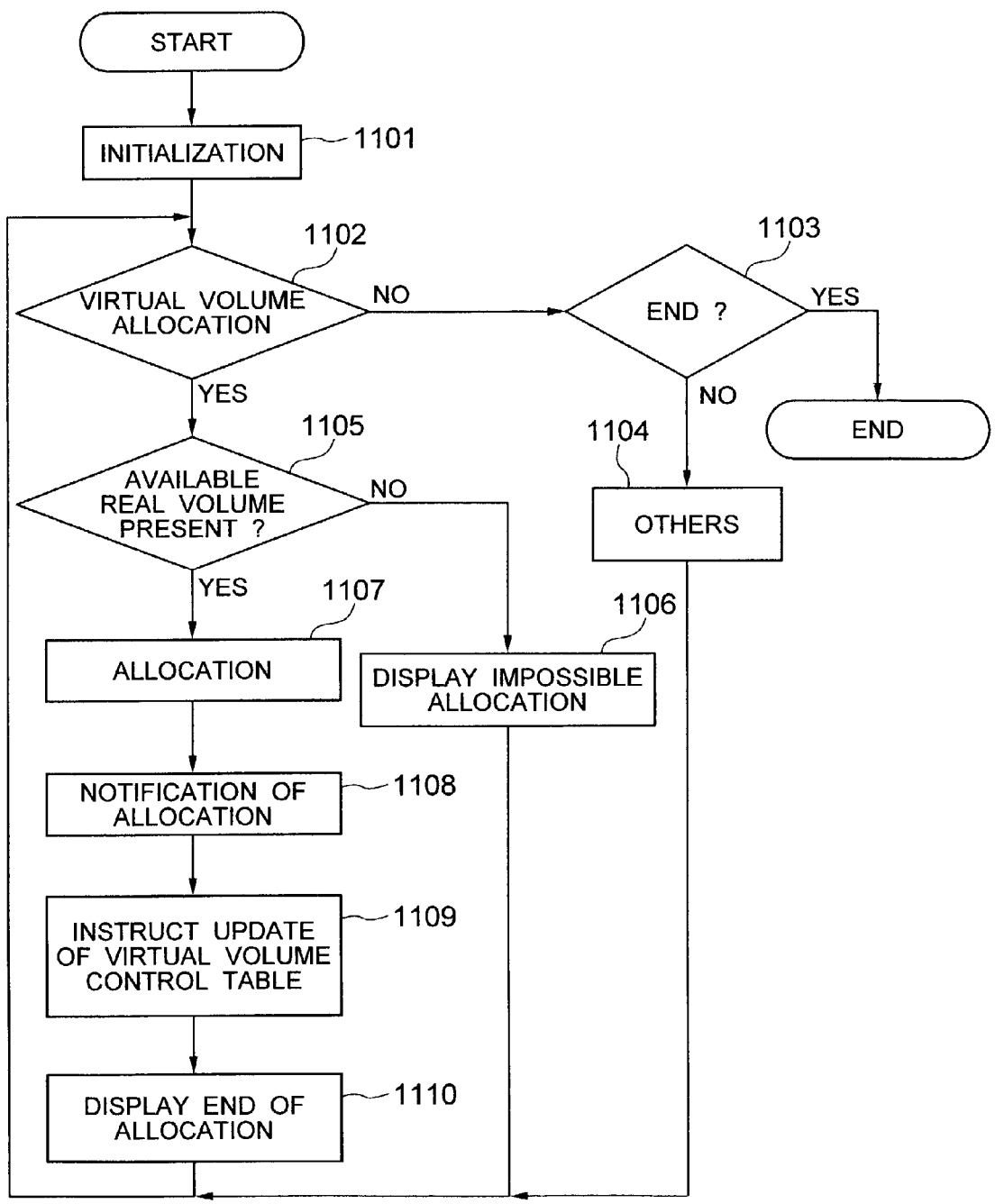
FIG. 11 is a flowchart showing a processing flow of a volume control program of the control server.

FIG. 11 shows in a flowchart a flow of processing of the volume control program 201 executed by the control server 102.

The server 102 executes processing such as initialization to read the control tables of the control server 102 (1101). The server 102 judges to determine whether or not an indication from the user is a virtual volume allocation request (1102). If the indication is a virtual volume allocation request, the server 102 judges to determine, by using the real volume control table 204, whether or not the storage systems 106 have available real volumes (1105).

If there exist available real volumes, the control server 102 extracts therefrom a storage area of storage capacity requested by the user and defines the area as one virtual volume or a plurality of virtual volumes. The server 102 then updates the contents of the real volume control table 204 and the virtual volume control table 203. Specifically, the contents of the tables are changed such that information indicating the defined virtual volumes is assigned to the available real volumes (1107).

Thereafter, the control server 102 notifies the allocation of the real volumes to the storage systems 106 (1108). The server 102 instructs the virtualization node 103, specifically, the virtualization server 104 and the virtualization switch 105 to update the virtual volume control table (1109). According to the request of the user, the server 102 notifies the allocation of the available volumes to the virtual volumes (1110). The server 102 then returns to step 1102 and waits for an indication from the user.

If no available volume is detected in step 1105, the control server 102 indicates to the user the impossible allocation of virtual volumes requested by the user (1106) and returns to step 1102 to wait for an indication from the user.

If the user request is other than a virtual volume allocation request in step 1102, the control server judges to determine whether or not the user request is a request to terminate the processing (1103). If the request is a processing termination request, the server 102 terminates the processing. Otherwise, the server 102 executes processing associated with the user request (1104) and returns to step 1102 to wait for an indication from the user.

Incidentally, the user indication may be directly inputted to the control server 102 or may be inputted from another program using a command. Additionally, the notification from the control server 102 to the user may be presented on a display of the control server 102 or may be outputted by another program using a command. The step to notify the real volume allocation to the storage systems 106 may be omitted.

The control server 102 monitors the state of the virtualization node 103. When a failure or a high load appears in a switch 105 or the like of the virtualization node, the server 102 issues an indication to the virtualization node or the server 101 to change an access route from the server 101 of the user to the storage system 106 to avoid a failure or the like. Through the operation, overall system performance can be kept unchanged. The processing is achieved when the server 102 executes the device state control program 202. The program 202 is repeatedly executed at a particular interval of time during the system operation or is executed in response to an indication from the user.

Figure 12:
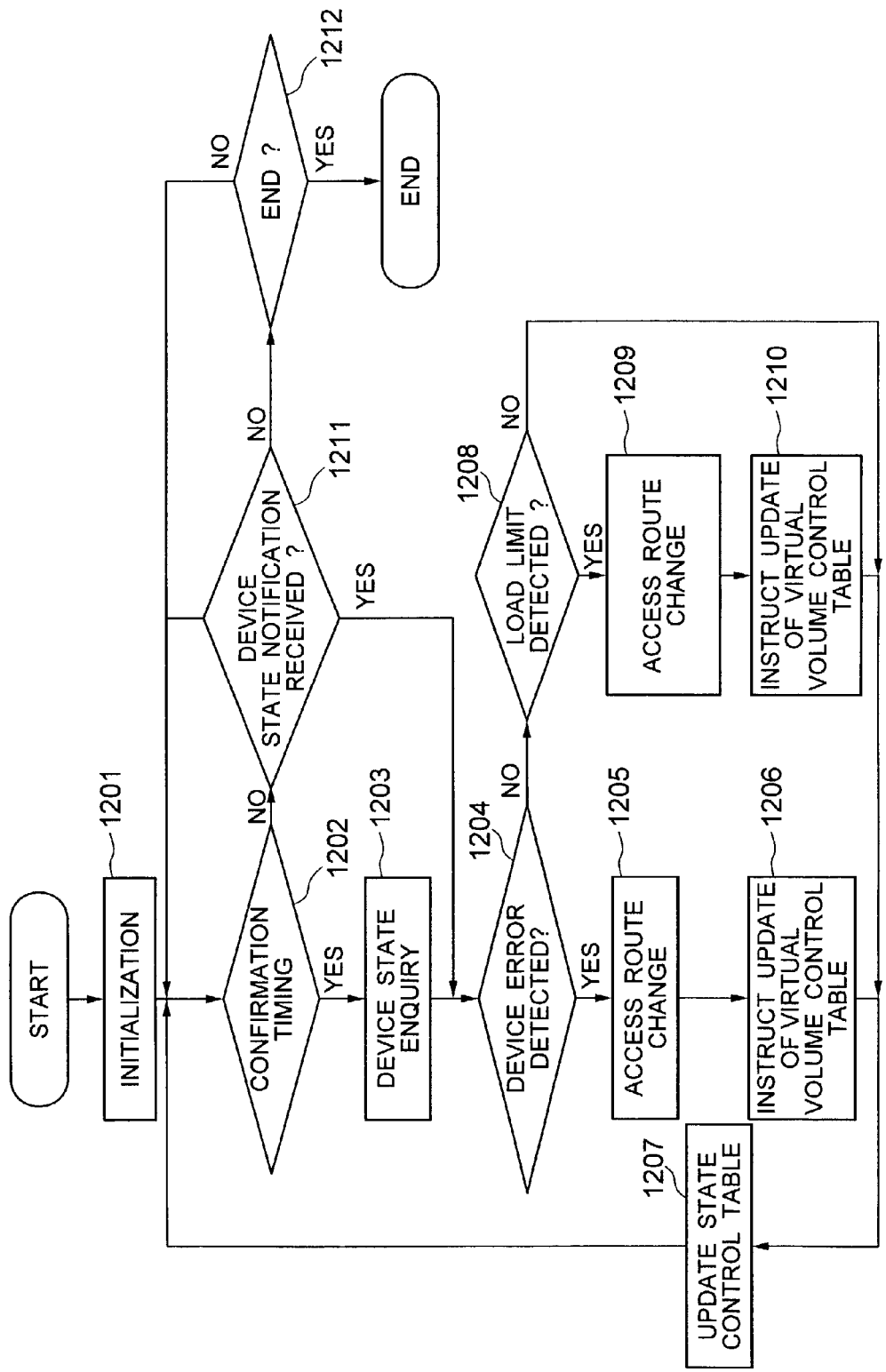
FIG. 12 is a flowchart showing a processing flow of a device state control program of the control server.

FIG. 12 shows a flow of processing of the device state control program 202 executed by the control server 102. The server 102 executes processing such as initialization to read the control tables (1201). The server 102 compares information of a predetermined time with the present time to determine whether or not the present time corresponds to timing to confirm the device state (1202).

If the present time corresponds to timing to confirm the device state, the control server 102 accesses the virtualization switch state control table 205 and the virtualization server state control table 206 to issue an enquiry of device state to the virtualization switches 105 and the virtualization servers 104.

Figure 16:
FIG. 16 is an example of commands exchanged between a virtualization node and a control server.
Figure 16:
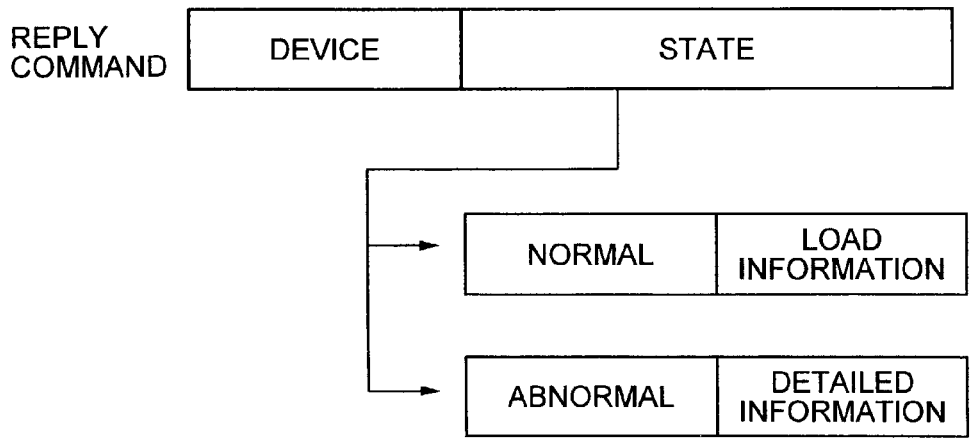

FIG. 16 shows an example of enquiry from the control server to the virtualization node and an example of a reply command to the enquiry. In the enquiry operation, information indicating presence or absence of a device failure and information of a state of the load imposed on the device are communicated. When the virtualization node 103 does not reply to an enquiry from the control server 102 to the virtualization node 103, the server 102 assumes that a failure occurs in the node 103 (1203).

When a failure is detected in a device as a result of the enquiry (1204), the control server 102 replaces the access route passing through the device in which the failure is detected with an access route passing through a device in which any failure is not detected. Specifically, the server 102 accesses the virtual volume control table 203 to retrieve virtual volumes supplied to the server 101 via the virtualization server 104 or the virtualization switch 105 in which the failure is detected. Thereafter, the server 102 changes the access routes so that the retrieved virtual volumes are supplied to the server via a normal virtualization switch 105 or a normal virtualization server 104. The server 102 accordingly updates the virtual volume control table (1205).

The control server 102 indicates the virtualization server 104 and the virtualization switch 105 to update the virtual volume control table. The server 102 also transmits information of the device in which the failure has occurred to the server 101 according to necessity (1206). The server 102 then updates the virtualization switch state control table 205 and the virtualization server state control table 206. Specifically, the entry corresponding to the failed device is changed from "normal" to "abnormal" (1207).

After the processing is finished, the control server 102 returns to step 1202 and judges to determine whether or not the present time is timing to confirm the device state. If no failure is detected in step 1204, the sever 102 confirms the load state of the virtualization node 103. Specifically, the server 102 confirms the load state obtained as a result of the enquiry to the device (1208).

When it is detected that the load of the virtualization switch 105 or the virtualization node 104 in the virtualization node 103 exceeds a predetermined value, e.g., 70%, the control server 102 changes the access route not to use the device of which the load exceeds the predetermined value, namely, the server 102 takes a detour. Specifically, the server 102 accesses the virtual volume control table 203 to retrieve processing associated with the virtual volumes supplied to the server 101 via the virtualization switch 105 or the virtualization node 104 of which the load exceeds the predetermined value. The server 102 selects particular processing from the retrieved processing and changes access routes of selected processing so that the selected processing is supplied via another virtualization switch 105 or another virtualization node 104. The server 102 updates the virtual volume control table 203.

Thereafter, the control server 102 indicates the virtualization switch 105 and the virtualization node 104 to update the virtualization volume control table. According to necessity, the server 102 sends information of the device of which the load is equal to or more than the predetermined value.

The virtualization node 103 having received the indication updates the virtualization volume control table. This establishes the new access routes (1210). The server 102 updates the virtualization switch state control table 205 and the virtualization server state control table 206 (1207).

The control server 102 returns to step 1202 to determine whether or not the present time corresponds to timing to confirm the device state. If the load is less than the predetermined value in step 1208, the server 102 updates, according to the information received from the virtualization node 103, the virtualization switch state control table 205 and the virtualization server state control table 206 in step 1207 and then returns to step 1202.

If it is not determined in step 1202 that the present time corresponds to timing to confirm the device state, the control server 102 judges to determine whether or not a device state notification has been received from the virtualization switch 105 or the virtualization server 104. Specifically, the server 102 confirms whether or not a communication control section, not shown, has received a device state notification from each device. Through the confirmation, even if a failure occurs at timing other than the periodic state confirmation point, it is possible to appropriately change associated access routes (1211). If the notification has been received, the server 102 executes processing of step 1204 and subsequent steps.

If the device state notification has not been received and an end indication has not been notified from the user in step 1211, the control server 102 returns to step 1202. If the end indication has been received in step 1212, the server 102 terminates the processing. Specifically, when the user indicates the end of processing or when the server 102 recognizes that the predetermined time is past, the server 102 assumes that the end indication is received and terminates the processing.

On the other hand, having received an indication from the control server 102 to update the virtual volume control table, the virtualization server 104 updates the control table using the volume control program 301.

Specifically, the virtualization server 104 confirms by the volume control program 301 whether or not an indication to update the virtual volume control table has been received from the control server 102. If it is confirmed that the reception of the update indication has been received from the server 102, the virtualization server 104 updates the virtual volume control table 304 according to the update indication.

The update processing similarly applies to the virtualization switch 105.

The virtualization switch 105 and the virtualization server 104 having updated the virtual volume control table 304 execute virtualization of the received data according to the contents of the updated virtual volume control table 304.

Assume that the control server 102 has detected an event that a failure occurs in a virtualization server 104 or a load imposed thereon is equal to or more than a predetermined value. In this situation, for example, if a failure has occurred in the virtualization server 104, the control server 102 updates the virtual volume control table 203 to form an access route not using the virtualization server 104. If the load imposed thereon is equal to or more than a predetermined value, the control server 102 updates the virtual volume control table 203 to form an access route such that part of the virtual volume processing being executed by the virtualization server 104 is passed to another virtualization server having a lower load. Thereafter, the control server 102 indicates the virtualization switch 105 and the virtualization server 104 to update the virtual volume control table. Having received the update indication, the switch 105 updates the table according to the indication. The switch 105 processes data to avoid the failed virtualization server 104 according to the updated virtual volume control table. As a result, the data is smoothly processed.

When a device state enquiry is received from the control server 102, the virtualization node 103 confirms its own state and notifies the state to the server 102. Or, the virtualization node 103 periodically confirms its own state and notifies the state to the server 102. The processing is achieved by executing the device state control program 303 and the like. The program 303 is executed according to an indication from the user of the control server when the virtualization node 103 is initiated and is repeatedly executed at a particular interval of time.

Figure 13:
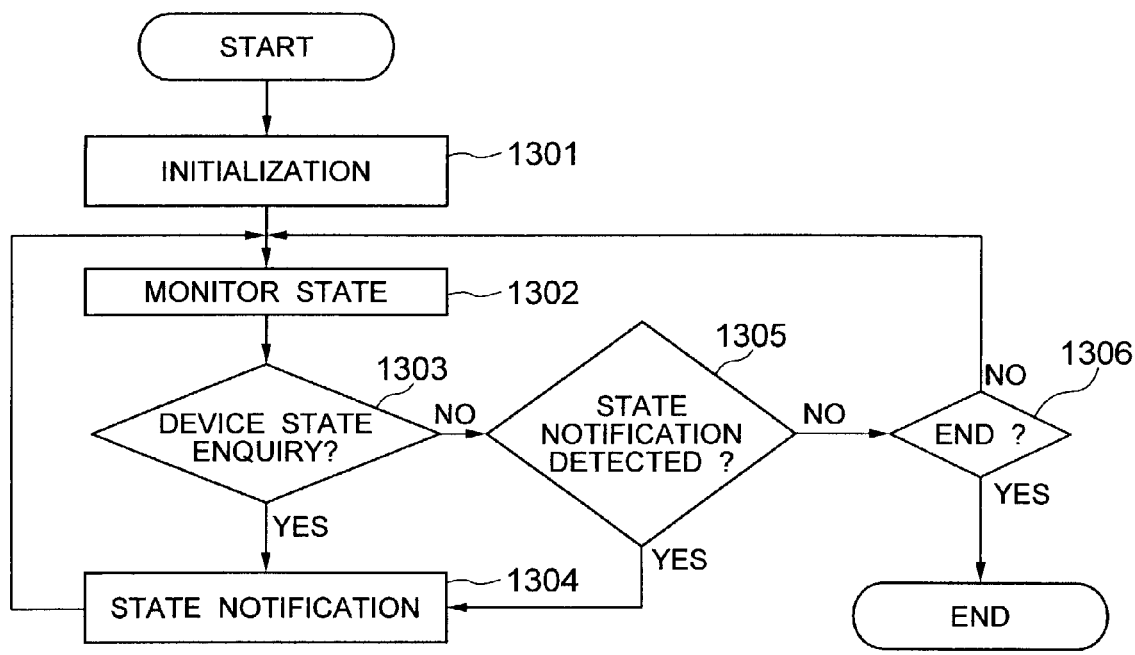
FIG. 13 is a flowchart showing a processing flow of a device state control program of the virtualization server.

FIG. 13 shows processing of the device state control program 303 in the virtualization server 104.

The server 104 conducts initialization (1301). The server 104 monitors its own state to update the device state control table 305 according to a change in the state (1302). The server 104 confirms whether or not a device state enquiry has been received from the control server 102 (1303). If the enquiry has been received, the server 104 notifies its own state controlled by the table 305 (1304).

If the enquiry has not been received in step 1303, the virtualization server 104 judges to determine occurrence of a state to be notified to the control server 102. For example, the server 104 determines whether or not the state is within a predetermined load (e.g., whether or not a load ratio of 70% is exceeded) or whether or not a failure has occurred in any section of the server 104 (1305).

If the state is to be notified to the control server 102, the virtualization server 104 notifies its own state to the server 102 (1304). If the state is not to be notified in step 1305, the virtualization server 104 judges to determine whether or not an end indication has been received (1306).

If such an end indication has been received, the server 104 terminates the program to finish the processing. Otherwise, the server 104 returns to step 1302. In this connection, the processing of step 1305 may be omitted. The end indication may be, for example, an indication from the user or an indication from a timer in response to a lapse of a predetermined period of time.

The processing described in conjunction with FIG. 13 is almost the same as the processing achieved when the virtualization switch 105 executes the device state control program 403.

In the virtualization node 103, according to the contents of processing of data received from a server 101 or a storage system 106, the virtualization switch 105 or the virtualization server 104 processes the data to send a result of the processing to the storage system 106 or the server 101.

Figure 14:
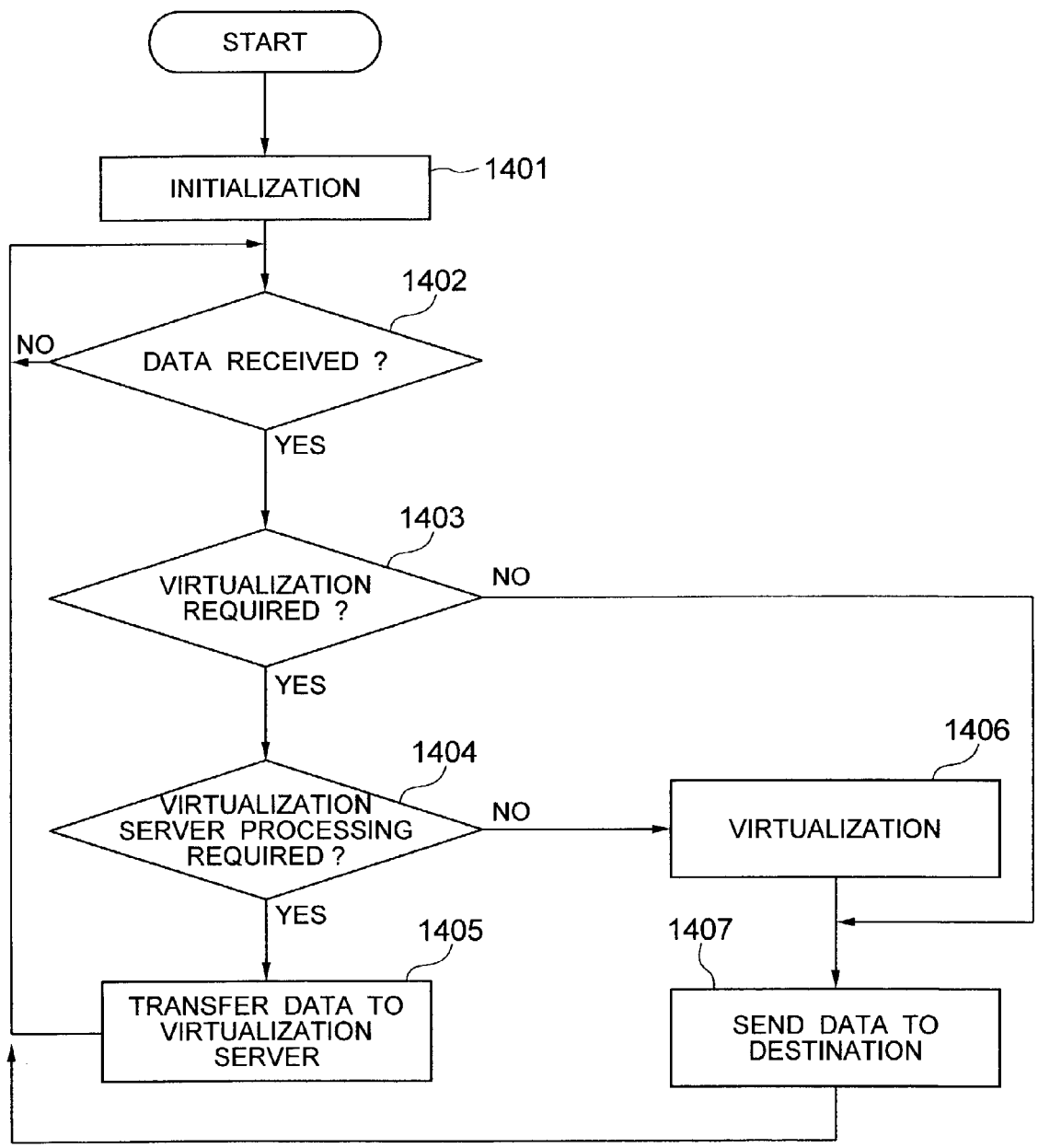
FIG. 14 is a flowchart showing a flow of virtualization processing of the virtualization switch.

FIG. 14 shows a flow of the virtualization processing 402 executed by the virtualization switch 105.

The switch 105 conducts initialization (1401). Having received data from a server 101 or a storage system 106 (1402), the switch 105 analyzes the data according to address information in the data.

Specifically, the switch 105 determines that the data is sent from a storage system (a real volume allocated to a virtual volume), the data is sent to a server 101 (a virtual volume), or the data source and destination are a storage system 106 or a server 101. According to a result of the analysis, the switch 105 judges to determine whether or not the data requires virtualization (1403). If the data requires virtualization, the switch 105 judges to determine according to the virtual volume control table 404 whether or not the data is to be processed by the virtualization server 104, for example, to be copied by the server 104 (1404).

If the data is to be processed by the virtualization server 104, the virtualization switch 105 transfers the data to the server 104 (1405). Thereafter, the switch 105 returns to step 1402.

If it is determined in step 1404 that the data does not require the processing of the virtualization server 104, the switch 105 executes virtualization processing. The processing is specifically executed as below. If the data transmission source is a real volume allocated to a virtual volume, the switch 105 treats the data as data from a virtual volume. If the data transmission source is a virtual volume, the switch 105 treats the data as data from a real volume (1406).

Thereafter, the virtualization switch 105 transmits the processed data to the destination (1407) and executes processing of step 1402.

If the data does not require the virtualization in step 1403, the switch 105 transmits the data to the destination (1407) and executes processing of step 1402. If it is determined in step 1402 that data has not been received, the switch 105 repeatedly executes processing of step 1402.

In this regard, the judgement to determine whether or not the received data is to be processed by the virtualization server 104 or the like may be conducted without using the virtual volume control table 404. The judgement may be conducted according to another aspect, for example, according to command information contained in the received data. It is also possible to omit step 1404. In this case, the entire processing of the virtual volume is transferred to the virtualization server 104.

Figure 15:
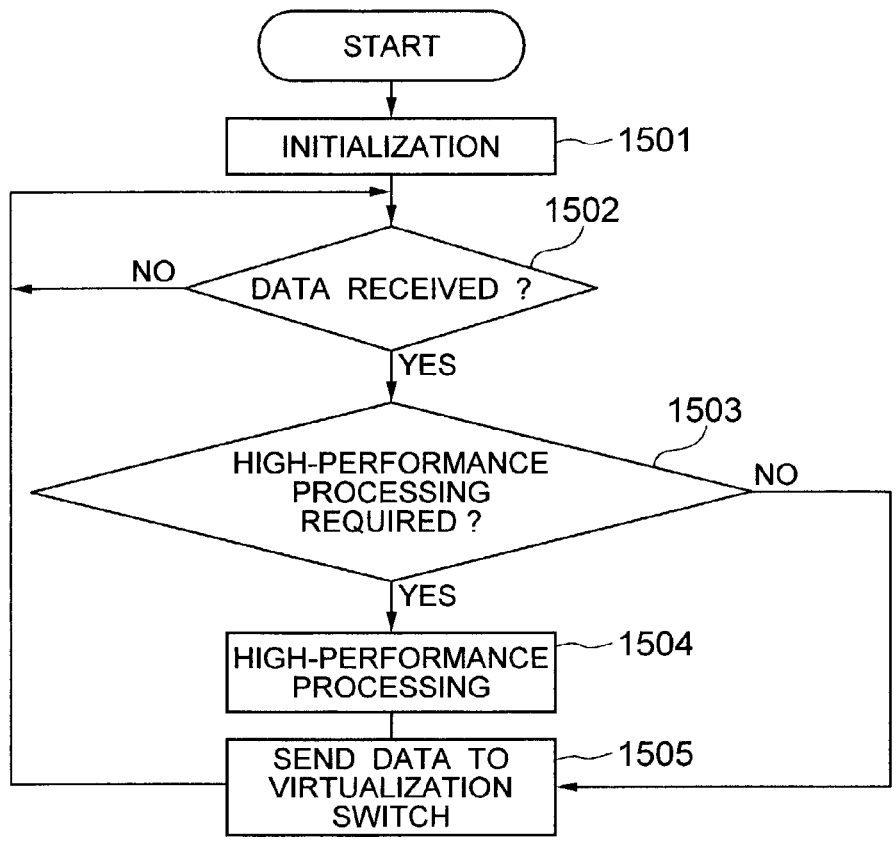
FIG. 15 is a flowchart showing a flow of virtualization processing of the virtualization server.

FIG. 15 shows a flow of the virtualization processing 302 in the virtualization server 104.

The server 104 conducts initialization (1501). When data is received from a virtualization switch 105 (1502), the server 104 judges to determine whether or not the data is to be processed by the virtualization server 104, for example, whether or not the data is copied by the server 104 (1503). If the data is to be processed by the server 104, the server executes an associated processing for the data.

Specific examples of processing executed by the virtualization server 104 are as follows. In data replication between storage systems 106, the server 104 reads data from a storage area of a storage system 106 and transfers the data to another storage system 106. In a data copy in a storage system 106, the server 104 issues an instruction that data is read from a storage area of the storage system 106 and is stored the data in another area of the storage system 106. In a data striping operation, the server 104 divides data stored in a storage system 106 into data items and sequentially transfers the data items to a plurality of disk devices of the storage system 106. Moreover, the server generates redundant data according to the divided data items and stores the redundant data in the storage system. In a mirroring operation, the virtualization server 104 receives data from a server 101 and stores the data in a plurality of disk devices of the storage system 106 (1504).

When the processing is finished, the virtualization server 104 sends the processed data to the virtualization switch 105 (1505). Having transmitted the data, the server 104 returns to step 1502 to continue processing. If it is not determined in step 1503 that the received data is to be processed by the virtualization server 104, the server 104 returns the data to the virtualization switch 105 (1505). The server 104 waits for reception of data in step 1502.

If a plurality of virtualization switches are disposed, the virtualization server 104 selects according to the virtual volume control table 304 one of the switches 105 to transfer the data to the selected switch 105.

In the description of the embodiment, the control server 102 is separated from the virtualization node 103. However, the virtualization node 103 may include the control server 102. Additionally, either one of a plurality of virtualization servers 104 included in the virtualization node 103 may operate as a control server 102.

According to the embodiment, the virtualization node 103 to execute the virtualization processing includes at least one virtualization switch 105 to execute a high-speed processing in which, for example, the switch 105 receives data and converts the data into data of a real volume to transfer the data to an associated storage system 106 and the switch 105 received data from a storage system 106 and converts the data into data from a virtualized volume to send the data to a server 101 and at least one virtualization server 104 which executes complex processing in which, for example, the server 104 copies data between the storage systems 106. Therefore, the virtualization processing in the virtualization node 103 can be executed in a sharing mode. As a result, there can be provided a virtualization system in which the virtualization node 103 does not become a bottleneck of the overall system processing.

According to the embodiment, the control server 102 which controls a correspondence between real volumes and virtual volumes and which controls the state of each device of the virtual system detects a virtualization switch 105 or a virtualization server 104 having a high processing load. The control server 102 conducts a control operation such that some virtual volumes being processed by the device in which a predetermined load has been detected are moved to a device having a low processing load. As a result, there can be configured a virtualization system in which the configuration of the virtualization system is changed according to increase in the processing load in the system to thereby provide stable performance.

According to the embodiment, the virtualization node 103 notifies increase in the processing load thereof to the control server 102. In response to the notification, the control server 102 moves several volumes being processed by devices in the virtualization node 103 to other devices having a low processing load in the virtualization node 103. As a result, it is possible to implement a virtualization system in which the virtualization is changed in the computer system according to increase in the processing load in the system to thereby provide performance at least equal to predetermined performance.

According to the embodiment, the control server 102 moves processing of a virtual volume being processed by a device in a failed virtualization node 103 to another device in a normal state. Therefore, there can be implemented a virtualization system in which even if a failure occurs in the virtualization system, a device in which an error occurs is easily replaced with a normal device in the virtualization system and hence the failure does not adversely influence any external device.

According to the embodiment, the virtualization node 103 notifies a failure thereof to the control server 102. In response to the notification, the control server 102 moves processing of a virtual volume under processing to a device in a normal state. Therefore, there can be implemented a virtualization system in which even if an error occurs in the virtualization system, a failed device is easily replaced with a normal device in the virtualization system and hence the error does not adversely influence any external device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system, comprising:
   a host;
   a plurality of storage systems;
   a virtualization apparatus for connecting the storage systems to the host; and
   a control computer, connected to said virtualization apparatus, for managing correspondence between storage areas of said storage systems and virtualized storage areas and managing a state of said virtualization apparatus,
   wherein said virtualization apparatus comprises:
   a plurality of virtualization servers each having a virtualization server function, and
   a plurality of virtualization switches each, being connected to said host, said storage systems and said virtualization servers and having a virtualization switch function, judges whether data received from said host or said storage systems requires virtualization processing or whether the received data is to be processed by at least one of said virtualization servers, said virtualization switches being separate from said virtualization servers,
   wherein said virtualization servers each, being connected to said virtualization switches and having a virtualization server function, performs a predetermined processing to data transmitted from said host or said storage systems if said virtualization switches judge that the received data is to be processed by said virtualization server,
   wherein said predetermined processing of said virtualization server is at least one of (i) a copy process of the received data, (ii) a data striping process of the received data, and (iii) a data mirroring process of the received data,
   wherein each virtualization switch judges whether the received data from the host or the storage systems is data upon which said virtualization processing is to be performed or whether the received data is data to be processed by at least one of said virtualization servers, and in response to a determination that the received data is data to be processed by at least one of said virtualization servers, transfers the received data to said at least one of said virtualization servers,
   wherein, if one of said virtualization switches or one of said virtualization servers has a failure, then another virtualization switch of said virtualization switches or another virtualization server of said virtualization servers in which a failure has not occurred performs said virtualization switch function or said virtualization server function instead of said one of said virtualization switches or said one of said virtualization servers in which the failure occurred by changing to a new access route of said another virtualization switch or said another virtualization server in which a failure has not occurred from an old access route of said one of said virtualization switches or said one of said virtualization servers in which the failure occurred,
   wherein the new access route of said another virtualization switch or said another virtualization server in which a failure has not occurred is determined based on information about said one of said virtualization switches or said one of said virtualization servers in which the failure occurred,
   wherein each virtualization server includes a memory which has stored therein a device state control table which stores information of the state of a load on said virtualization server, and monitoring means for monitoring the state of a load on said virtualization server and updating said information of the state of a load on said virtualization server stored in said device state control table when the state of the load on said virtualization server changes,
   wherein each virtualization switch includes a memory which has stored therein a device state control table which stores information of the state of a load on said virtualization switch, and monitoring means for monitoring the state of the load on said virtualization switch and updating said information of the state of a load on said virtualization switch stored in said device state control table when the state of the load on said virtualization switch changes,
   wherein said control computer includes a memory which has stored therein a server state control table which stores in corresponding relation for each virtualization server an identifier (ID) of said virtualization server, information of the state of said virtualization server and information of the state of a load on said virtualization server, and a switch state control table which stores in corresponding relation for each virtualization switch an ID of said virtualization switch, information of the state of said virtualization switch and information of the state of a load on said virtualization switch, and
   wherein said control computer monitors the state of the load on each of said virtualization servers and said virtualization switches by sending an inquiry to said each of said virtualization servers and said virtualization switches, which in response to said inquiry, obtains said information of the state of the load on said each of said virtualization servers and said virtualization switches from said device state control table and sends said information of the state of the load on said each of said virtualization servers and said virtualization switches to said control computer, and by storing said information of the state of the load on said each of said virtualization servers and said virtualization switches received from said each of said virtualization servers and said virtualization switches in said server state control table or said switch state control table.

2. A computer system according to claim 1, wherein said virtualization server processes the data transferred from said virtualization switch and returns data resulting from the processing to said virtualization switch, and
   wherein said virtualization switch includes means for transmitting the data returned from said virtualization server to an associated one of the storage systems.

3. A computer system according to claim 1,
   wherein said control computer comprises:
   means for keeping virtualization information which is used to virtualize storage areas of the storage systems;
   means for updating the virtualization information; and
   means for transmitting to said virtualization apparatus the virtualization information updated by said update means, wherein each of said virtualization switch and said virtualization server include means for determining, according to the virtualization information sent from said control computer, which one of said virtualization switch and said virtualization server is to process data sent from the host, wherein each of said virtualization switch and said virtualization server comprises:

means for transmitting to said control computer said information of the state of the load of said virtualization switch or said virtualization server obtained by said monitoring means and stored in said device state control table; and wherein said control computer comprises:

means for selecting, according to said information of the state of the load of said virtualization switch or said virtualization server received from said virtualization switch or said virtualization server, devices having a predetermined load, means for changing the virtualization information according to information of the devices selected by said selecting means, and means for transmitting the virtualization information changed by said changing means to the virtualization apparatus;

wherein said control computer comprises:

means for obtaining, from the virtualization apparatus, information indicating a load of the virtualization apparatus, means for changing the virtualization information according to the information obtained by the obtaining means, and means for transmitting to the virtualization apparatus the virtualization information changed by said changing means.

4. A computer system according to claim 3 wherein each computer comprises:

means for monitoring an operation state of said computer system, and means for transmitting to said control computer information of the operation state obtained by said monitor means; and wherein said control computer comprises means for selecting, according to information of operation states received from a virtualization switch or a virtualization server in which a failure has occurred, devices in which a failure has not occurred, means for changing the virtualization information according to information of the devices selected by said selecting means, and means for transmitting the virtualization information changed by said changing means to the virtualization apparatus.

5. A computer system according to claim 1, wherein said predetermined processing performed by said virtualization server is one of data replication between the storage systems, data copying between the storage systems, a data striping operation of dividing data in a storage system into data items and transferring some of the data items to different disk devices of the storage system and a mirroring operation of storing data received from a managing server in different disk devices of a storage system.

6. A computer system according to claim 1, wherein said virtualization processing includes determining whether the received data is for a virtual volume or a real volume.

7. A computer system according to claim 1, wherein said inquiry is an inquiry command which is sent to determine a state of said virtualization switches or said virtualization servers and information concerning the state of said virtualization switches or said virtualization servers is sent as a reply command in response to said inquiry command.

8. A computer system according to claim 7, wherein if no reply command is received in response to said inquiry command, then a failure in said virtualization switches or said virtualization servers has occurred.

9. A computer system according to claim 8, wherein if no failure has occurred in said virtualization switches or said virtualization servers, then an inquiry command is sent to determine a state of the load on said virtualization switches or said virtualization servers and information concerning the state of the load on said virtualization switches or said virtualization servers is sent as a reply command in response to said inquiry command.

10. A computer system according to claim 9, wherein if the state of the load on a virtualization switch or a virtualization server exceeds a predetermined value, then another virtualization switch of said virtualization switches or another virtualization server of said virtualization servers in which the load does not exceed the predetermined value performs said virtualization switch function or said virtualization server function instead of said one of said virtualization switches or said one of said virtualization servers in which the load exceeds the predetermined value by changing to a new access route of said another virtualization switch or said another virtualization server in which the load does not exceed the predetermined value from an old access route of said one of said virtualization switches or said one of said virtualization servers in which the load exceeds the predetermined value, and wherein the new access route of said another virtualization switch or said another virtualization server in which the load does not exceed the predetermined value is determined based on information about said one of said virtualization switches or said one of said virtualization servers in which the load exceeds the predetermined value.

11. A virtualization apparatus for connecting a host to a plurality of storage systems, said virtualization apparatus comprising:

a plurality of virtualization servers each having a virtualization server function; and a plurality of virtualization switches each, being connected to said host, said storage systems and said virtualization servers and having a virtualization switch function, for judging whether data received from said host or said storage systems requires virtualization processing or whether the received data is to be processed by at least one of said virtualization servers, said virtualization switches being separate from said virtualization servers, wherein said virtualization servers each, being connected to said virtualization switches and having a virtualization server function, performs a predetermined processing to data transmitted from said host or said storage systems if said virtualization switches judge that the received data is to be processed by said virtualization server, wherein said predetermined processing of said virtualization server is at least one of (i) a copy process of the received data, (ii) a data striping process of the received data, and (iii) a data mirroring process of the received data, wherein said each virtualization switch comprises:

means for confirming whether the received data from said host or said storage systems is predetermined data, means for judging, when said confirming means determines that the received data is predetermined data, whether the received data is data upon which said virtualization processing is to be performed or whether the received data is data to be processed by at least one of said virtualization servers, and means for transmitting, when said judging means determines that the received data is data to be processed by at least one of said virtualization servers, the received data to said at least one of said virtualization servers wherein said each virtualization server comprises:

means for conducting said predetermined processing on the received data transferred from said virtualization switches, wherein, if one of said virtualization switches or one of said virtualization servers has a failure, then another virtualization switch of said virtualization switches or another virtualization server of said virtualization servers in which a failure has not occurred performs said virtualization switch function or said virtualization server function instead of said one of said virtualization switches or said one of said virtualization servers in which the failure occurred by changing to a new access route of said another virtualization switch or said another virtualization server in which a failure has not occurred from an old access route of said one of said virtualization switches or said one of said virtualization servers in which the failure occurred, wherein the new access route of said another virtualization switch or said another virtualization server in which a failure has not occurred is determined based on information about said one of said virtualization switches or said one of said virtualization servers in which the failure occurred, wherein said virtualization apparatus is connected to a control computer which manages correspondence between storage areas of said storage systems and virtualized storage areas and manages a state of said virtualization apparatus, wherein each virtualization server includes a memory which has stored therein a device state control table which stores information of the state of a load on said virtualization server, and monitoring means for monitoring the state of a load on said virtualization server and updating said information of the state of a load on said virtualization server stored in said device state control table when the state of the load on said virtualization server changes, wherein each virtualization switch includes a memory which has stored therein a device state control table which stores information of the state of a load on said virtualization switch, and monitoring means for monitoring the state of the load on said virtualization switch and updating said information of the state of a load on said virtualization switch stored in said device state control table when the state of the load on said virtualization switch changes, wherein said control computer includes a memory which has stored therein a server state control table which stores in corresponding relation for each virtualization server an identifier (ID) of said virtualization server, information of the state of said virtualization server and information of the state of a load on said virtualization server, and a switch state control table which stores in corresponding relation for each virtualization switch an ID of said virtualization switch, information of the state of said virtualization switch and information of the state of a load on said virtualization switch, and wherein said control computer monitors the state of the load on each of said virtualization servers and said virtualization switches by sending an inquiry to said each of said virtualization servers and said virtualization switches, which in response to said inquiry, obtains said information of the state of the load on said each of said virtualization servers and said virtualization switches from said device state control table and sends said information of the state of the load on said each of said virtualization servers and said virtualization switches to said control computer, and by storing said information of the state of the load on said each of said virtualization servers and said virtualization switches received from said each of said virtualization servers and said virtualization switches in said server state control table or said switch state control table.

12. A virtualization apparatus according to claim 11, wherein the number of each of said virtualization switches and said virtualization servers are two or more.

13. A virtualization apparatus according to claim 11, wherein said copy process includes copying between the storage systems, said data striping process includes dividing data in a storage system into data items and transferring some of the data items to different disk devices of the storage system and said data mirroring process includes storing data received from a managing server in different disk devices of a storage system.

14. A virtualization apparatus according to claim 11, wherein said virtualization processing includes determining whether the received data is for a virtual volume or a real volume.

15. A virtualization apparatus according to claim 11, wherein said inquiry is an inquiry command which is sent to determine a state of said virtualization switches or said virtualization servers and information concerning the state of said virtualization switches or said virtualization servers is sent as a reply command in response to said inquiry command.

16. A virtualization apparatus according to claim 15, wherein if no reply command is received in response to said inquiry command, then a failure in said virtualization switches or said virtualization servers has occurred.

17. A virtualization apparatus according to claim 16, wherein if no failure has occurred in said virtualization switches or said virtualization servers, then an inquiry command is sent to determine a state of the load on said virtualization switches or said virtualization servers and information concerning the state of the load on said virtualization switches or said virtualization servers is sent as a reply command in response to said inquiry command.

18. A virtualization apparatus according to claim 17, wherein if the state of the load on a virtualization switch or a virtualization server exceeds a predetermined value, then another virtualization switch of said virtualization switches or another virtualization server of said virtualization servers in which the load does not exceed the predetermined value performs said virtualization switch function or said virtualization server function instead of said one of said virtualization switches or said one of said virtualization servers in which the load exceeds the predetermined value by changing to a new access route of said another virtualization switch or said another virtualization server in which the load does not exceed the predetermined value from an old access route of said one of said virtualization switches or said one of said virtualization servers in which the load exceeds the predetermined value, and
wherein the new access route of said another virtualization switch or said another virtualization server in which the load does not exceed the predetermined value is determined based on information about said one of said virtualization switches or said one of said virtualization servers in which the load exceeds the predetermined value.

19. A control computer connected to a virtualization apparatus connecting a host and a plurality of storage systems, comprising:
means for holding virtualization information of a correspondence between storage areas of the storage systems and virtualized storage areas;
means for updating the virtualization information; and
means for transmitting the information updated by said update means to said virtualization apparatus,
wherein said virtualization apparatus comprises:
a plurality of virtualization servers each having a virtualization server function, and
a plurality of virtualization switches each, being connected to said host, said storage systems and said virtualization servers and having a virtualization switch function, judges whether data received from said host or said storage systems requires a virtualization processing or whether the received data is to be processed by at least one of said virtualization servers, said virtualization switches being separate from said virtualization servers,
wherein said virtualization servers each, being connected to said virtualization switches and having a virtualization server function, performs a predetermined processing to data transmitted from said host or said storage systems if said virtualization switches judge that the received data is to be processed by said virtualization server,
wherein said predetermined processing of said virtualization server is at least one of (i) a copy process of the received data, (ii) a data striping process of the received data, and (iii) a data mirroring process of the received data,
wherein each virtualization switch judges whether the received data from the host is data upon which said virtualization processing is to be performed or whether the received data is data to be processed by at least one of said virtualization servers, and if the received data is data to be processed by at least one of said virtualization servers, transfers the received data to said at least one of said virtualization servers,
wherein, if one of said virtualization switches or one of said virtualization servers has a failure, then another virtualization switch of said virtualization switches or another virtualization server of said virtualization servers in which a failure has not occurred performs said virtualization switch function or said virtualization server function, instead of said one of said virtualization switches or said one of said virtualization servers in which the failure occurred by changing a new access route of said another virtualization switch or said another virtualization server in which a failure has not occurred from an old access route of said one of said virtualization switches or said one of said virtualization servers in which the failure occurred,
wherein the new access route of said another virtualization switch or said another virtualization server in which a failure has not occurred is determined based on information about said one of said virtualization switches or said one of said virtualization servers in which the failure occurred,
wherein control computer manages correspondence between storage areas of said storage systems and virtualized storage areas and manages a state of said virtualization apparatus,
wherein each virtualization server includes a memory which has stored therein a device state control table which stores information of the state of a load on said virtualization server, and monitoring means for monitoring the state of a load on said virtualization server and updating said information of the state of a load on said virtualization server stored in said device state control table when the state of the load on said virtualization server changes,
wherein each virtualization switch includes a memory which has stored therein a device state control table which stores information of the state of a load on said virtualization switch, and monitoring means for monitoring the state of the load on said virtualization switch and updating said information of the state of a load on said virtualization switch stored in said device state control table when the state of the load on said virtualization switch changes,
wherein said control computer includes a memory which has stored therein a server state control table which stores in corresponding relation for each virtualization server an identifier (ID) of said virtualization server, information of the state of said virtualization server and information of the state of a load on said virtualization server, and a switch state control table which stores in corresponding relation for each virtualization switch an ID of said virtualization switch, information of the state of said virtualization switch and information of the state of a load on said virtualization switch, and
wherein said control computer monitors the state of the load on each of said virtualization servers and said virtualization switches by sending an inquiry to said each of said virtualization servers and said virtualization switches, which in response to said inquiry, obtains said information of the state of the load on said each of said virtualization servers and said virtualization switches from said device state control table and sends said information of the state of the load on said each of said virtualization servers and said virtualization switches to said control computer, and by storing said information of the state of the load on said each of said virtualization servers and said virtualization switches received from said each of said virtualization servers and said virtualization switches in said server state control table or said switch state control table.

20. A control computer according to claim 19, further comprising:
means for obtaining, from the virtualization apparatus, said information of the state of the load on the virtualization apparatus;
means for changing the virtualization information according to said information of the state of the load on the virtualization apparatus obtained by the obtaining means; and
means for transmitting the information updated by the update means to the virtualization apparatus.

21. A control computer according to claim 19, further comprising:

means for obtaining, from the virtualization apparatus, information indicating a failure in the virtualization apparatus;

means for changing the virtualization information according to the information obtained by the obtaining means; and means for transmitting the information updated by the update means to the virtualization apparatus.

22. A control computer according to claim 19, wherein said copy process includes copying between the storage systems, said data striping process includes dividing data in a storage system into data items and transferring some of the data items to different disk devices of the storage system and said data mirroring process includes storing data received from a managing server in different disk devices of a storage system.

23. A control computer according to claim 19, wherein said virtualization processing includes determining whether the received data is for a virtual volume or a real volume.

24. A control computer according to claim 19, wherein said inquiry is an inquiry command which is sent to determine a state of said virtualization switches or said virtualization servers and information concerning the state of said virtualization switches or said virtualization servers is sent as a reply command in response to said inquiry command.

25. A control computer according to claim 24, wherein if no reply command is received in response to said inquiry command, then a failure in said virtualization switches or said virtualization servers has occurred.

26. A control computer according to claim 25, wherein if no failure has occurred in said virtualization switches or said virtualization servers, then an inquiry command is.sent to determine a state of the load on said virtualization switches or said virtualization servers and information concerning the state of the load on said virtualization switches or said virtualization servers is sent as a reply command in response to said inquiry command.

27. A control computer according to claim 26, wherein if the state of the load on a virtualization switch or a virtualization server exceeds a predetermined value, then another virtualization switch of said virtualization switches or another virtualization server of said virtualization servers in which the load does not exceed the predetermined value performs said virtualization switch function or said virtualization server function instead of said one of said virtualization switches or said one of said virtualization servers in which the load exceeds the predetermined value by changing to a new access route of said another virtualization switch or said another virtualization server in which the load does not exceed the predetermined value from an old access route of said one of said virtualization switches or said one of said virtualization servers in which the load exceeds the predetermined value, and wherein the new access route of said another virtualization switch or said another virtualization server in which the load does not exceed the predetermined value is determined based on information about said one of said virtualization switches or said one of said virtualization servers in which the load exceeds the predetermined value.

28. A method of acquiring information in a computer system including a plurality of storage systems, a virtualization apparatus, which includes a plurality of virtualization switches and a plurality of virtualization servers which are separate from the virtualization switches, for connecting the storage systems to the host, and a control computer connected to said virtualization apparatus, said method comprising the steps of:

in the host, outputting to the virtualization apparatus an access request to access the storage systems;

in each virtualization switch, judging whether data received from the host or the storage systems is data upon which said virtualization processing is to be performed by said virtualization switch, or whether the received data is to be processed by at least one of said virtualization servers;

when the data is determined by said virtualization switch to be data to be processed by said at least one of said virtualization servers, transmitting the data to said at least one of said virtualization servers; and in said at least one of said virtualization servers, conducting a predetermined processing on data transferred from the virtualization switch, wherein said predetermined processing of said at least one of said virtualization servers is at least one of (i) a copy process of the received data, (ii) a data striping process of the received data, and (iii) a data mirroring process of the received data, wherein, if one of said virtualization switches or one of said virtualization servers has a failure, then another virtualization switch of said virtualization switches or another virtualization server of said virtualization servers in which a failure has not occurred performs said virtualization switch function or said virtualization server function instead of said one of said virtualization switches or said one of said virtualization servers in which the failure occurred by changing to a new access route of said another virtualization switch or said another virtualization server in which a failure has not occurred from an old access route of said one of said virtualization switches or said one of said virtualization servers in which the failure occurred, wherein the new access route of said another virtualization switch or said another virtualization server in which a failure has not occurred is determined based on information about said one of said virtualization switches or said one of said virtualization servers in which the failure occurred, wherein said control computer manages correspondence between storage areas of said storage systems and virtualized storage areas and manages a state of said virtualization apparatus, wherein each virtualization server includes a memory which has stored therein a device state control table which stores information of the state of a load on said virtualization server, and monitoring means for monitoring the state of a load on said virtualization server and updating said information of the state of a load on said virtualization server stored in said device state control table when the state of the load on said virtualization server changes, wherein each virtualization switch includes a memory which has stored therein a device state control table which stores information of the state of a load on said virtualization switch, and monitoring means for monitoring the state of the load on said virtualization switch and updating said information of the state of a load on said virtualization switch stored in said device state control table when the state of the load on said virtualization switch changes, wherein said control computer includes a memory which has stored therein a server state control table which stores in corresponding relation for each virtualization server an identifier (ID) of said virtualization server, information of the state of said virtualization server and information of the state of a load on said virtualization server, and a switch state control table which stores in corresponding relation for each virtualization switch an ID of said virtualization switch, information of the state of said virtualization switch and information of the state of a load on said virtualization switch, and wherein said control computer monitors the state of the load on each of said virtualization servers and said virtualization switches by sending an inquiry to said each of said virtualization servers and said virtualization switches, which in response to said inquiry, obtains said information of the state of the load on said each of said virtualization servers and said virtualization switches from said device state control table and sends said information of the state of the load on said each of said virtualization servers and said virtualization switches to said control computer, and by storing said information of the state of the load on said each of said virtualization servers and said virtualization switches received from said each of said virtualization servers and said virtualization switches in said server state control table or said switch state control table.

29. A method of acquiring information in a computer system according to claim 28, further comprising the steps of:
returning to the virtualization apparatus a processing result of the transmitted data by the virtualization server; and
transmitting the processing result from said virtualization apparatus to said storage system or the host.

30. A method of acquiring information in a computer system according to claim 28, wherein said copy process includes copying between the storage systems, said data striping process includes dividing data in a storage system into data items and transferring some of the data items to different disk devices of the storage system and said data mirroring process includes storing data received from a managing server in different disk devices of a storage system.

31. A method according to claim 28, wherein said virtualization processing includes determining whether the received data is for a virtual volume or a real volume.

32. A method according to claim 28, wherein said inquiry is an inquiry command which is sent to determine a state of said virtualization switches or said virtualization servers and information concerning the state of said virtualization switches or said virtualization servers is sent as a reply command in response to said inquiry command.

33. A method according to claim 32, wherein if no reply command is received in response to said inquiry command, then a failure in said virtualization switches or said virtualization servers has occurred.

34. A method according to claim 33, wherein if no failure has occurred in said virtualization switches or said virtualization servers, then an inquiry command is sent to determine a state of the load on said virtualization switches or said virtualization servers and information concerning the state of the load on said virtualization switches or said virtualization servers is sent as a reply command in response to said inquiry command.

35. A method according to claim 34, wherein if the state of the load on a virtualization switch or a virtualization server exceeds a predetermined value, then another virtualization switch of said virtualization switches or another virtualization server of said virtualization servers in which the load does not exceed the predetermined value performs said virtualization switch function or said virtualization server function instead of said one of said virtualization switches or said one of said virtualization servers in which the load exceeds the predetermined value by changing to a new access route of said another virtualization switch or said another virtualization server in which the load does not exceed the predetermined value from an old access route of said one of said virtualization switches or said one of said virtualization servers in which the load exceeds the predetermined value, and wherein the new access route of said another virtualization switch or said another virtualization server in which the load does not exceed the predetermined value is determined based on information about said one of said virtualization switches or said one of said virtualization servers in which the load exceeds the predetermined value.

* * * * *